(No Model.)
P. J. DOYLE.
SPRAY NOZZLE.
No. 575,596. Patented Jan. 19, 1897.
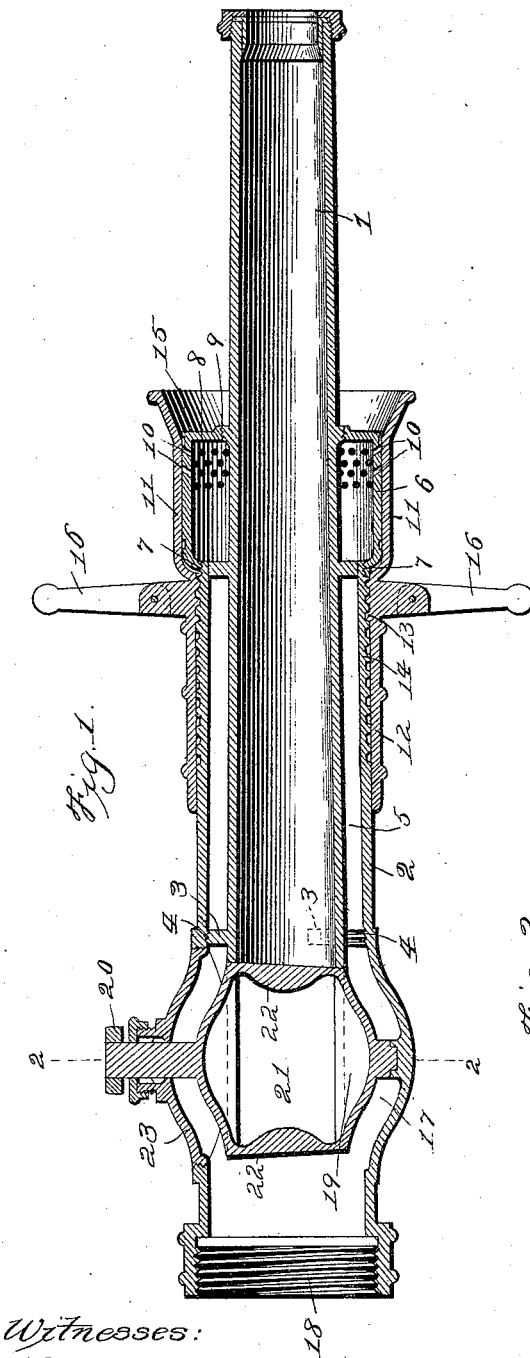
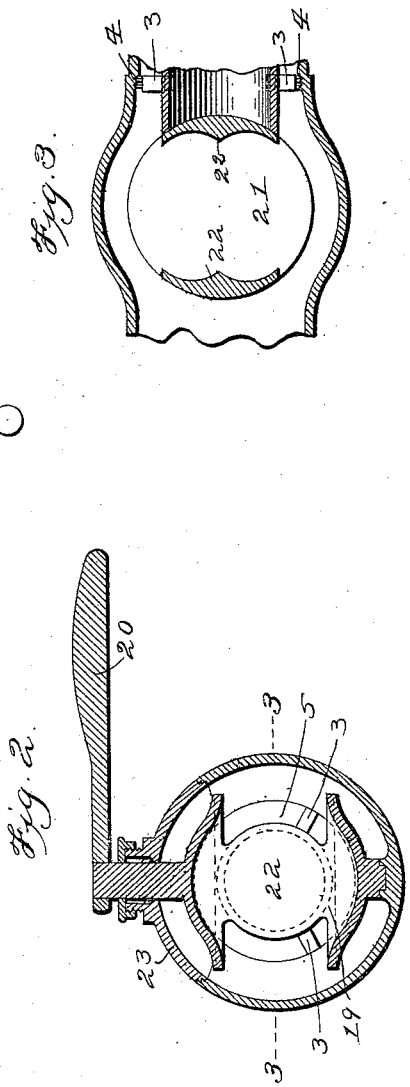
Witnesses:
Herbert Bradley
Geo. E. Cruse
Inventor:
P. J. Doyle
By Knight Bros.
Attorneys

UNITED STATES PATENT OFFICE.

PHILIP J. DOYLE, OF MEMPHIS, TENNESSEE.

SPRAY-NOZZLE.

SPECIFICATION forming part of Letters Patent No. 575,596, dated January 19, 1897.

Application filed April 17, 1896. Serial No. 587,924. (No model.)

*To all whom it may concern:*

Be it known that I, PHILIP J. DOYLE, a citizen of the United States, residing at Memphis, in the county of Shelby and State of Tennessee, have invented certain new and useful Improvements in Adjustable Spray-Nozzles, of which the following is a specification.

My invention relates more particularly to that class of nozzles which are used on hose-pipe through which a forced stream of water passes, though it may be used for any purposes for which nozzles are employed, and it is so adapted and arranged that it can be made to either spray the water or allow it to pass out in a solid stream, or to spray and at the same time allow it to pass out in a solid stream, and any of these changes can be rapidly effected without any strain on the pipe or cramping of the engine.

My invention consists, essentially, of a tube-nozzle surmounted by a casing, to which is secured an enlarged head, in which are formed a number of perforations which spray the water passing out of them. The opening for the solid stream is closed by a suitable valve and the perforations are closed by a sliding sleeve or cover provided with a bell-mouth for directing the spray, which is moved over and away from the projections in the enlarged head.

My invention further consists of certain details of construction that will be hereinafter more fully described, and in order that my invention may be fully understood I will proceed to describe the same with reference to the accompanying drawings, in which—

Figure 1 is a vertical longitudinal section of my improved device. Fig. 2 is a vertical section taken on the line 2 2, Fig. 1; and Fig. 3 is a horizontal section taken on the line 3 3, Fig. 2.

In the said drawings, 1 represents the tube for the solid stream, and 2 the casing for inclosing the tube. The tube, as will be seen, is supported concentrically within the casing 2 by means of the lugs 3, which are carried by the tube 1, and works on the screw-thread 4, formed on the casing 2. By this construction water is allowed to pass through the space 5 into the enlarged head 6, which is screwed onto the casing 2 at 7. The head is closed at 8, but has an opening 9 for the passage of the tube 1, and it is provided with the inclined openings 10, which spray the water. These openings are opened and closed by means of the bell-shaped portion 11 of the sleeve 12, which works on the tube 1 through the medium of the screw-threads 13 and 14.

15 represents a flaring portion on the bell part 11, and 16 represents pivoted arms for operating the sleeve and to also serve as a means for holding the nozzle. They may be turned down when not in use.

The rear end of the casing 2 is formed with the enlarged portion 17 and with the screw-threaded end 18 for attachment to a water-supply.

19 represents a valve which is mounted in the enlarged part 17, so as to be turned therein by the handle 20. The valve is formed so as to have a passage-way 21 and with the thickened parts 22, either of which, when turned to the proper position, closes the entrance to the tube 1 and thereby shuts off the water-supply.

23 represents a removable cap for the enlarged portion of the casing 2, which when it is desired to take out the valve is taken off, and when the valve is out of the way the tube 1 can be removed by unscrewing it from its bearing in the casing and pushing it out at the supply end 18.

The operation of my device will be readily understood from the above description. It will be seen that by turning the valve and sliding back the sleeve a solid stream and a spray can be directed where desired, or either the spray or solid stream may be used alone as desired, and a change from one to the other can be easily effected without any perceptible effect on the hose or engine.

Having thus described my invention, the following is what I claim as new therein and desire to secure by Letters Patent:

1. In a nozzle of substantially the character specified the combination of a tube, a casing for said tube having a head provided with a series of inclined perforations and a central opening for the passage of the tube, a valve for said tube and a sliding sleeve for opening and closing the perforations, substantially as shown and described.

2. In a nozzle the combination of a tube, a casing inclosing said tube and provided with a central opening for the passage of a tube and a head having perforations, a valve for said tube and a sliding sleeve having a bell-mouth for said perforations, substantially as shown and described.

3. In a nozzle the combination of a tube, a casing for said tube a head secured to said casing and provided with a central opening for the passage of the tube and a series of inclined perforations, a valve for said tube, a sliding sleeve for said perforations, and suitable means for adjustably moving said cover consisting of a threaded portion on the cover engaging a threaded portion on the tube, substantially as shown and described.

4. A nozzle comprising a tube for a solid stream of water, a casing inclosing said tube having perforations therein for spraying water, a valve for said tube a sleeve for said perforations and suitable independent means for operating the valve and sleeve, as explained.

PHILIP J. DOYLE.

Witnesses:
JAMES BURKE,
JAMES V. RYAN.